Nov. 15, 1955 R. L. ASHENHURST 2,724,103

ELECTRICAL CIRCUITS EMPLOYING MAGNETIC CORE MEMORY ELEMENTS

Filed Dec. 31, 1953 2 Sheets-Sheet 1

INVENTOR
R. L. ASHENHURST
BY Jonas W. Falk
ATTORNEY

INVENTOR
R. L. ASHENHURST
BY
James W. Falk
ATTORNEY

United States Patent Office 2,724,103

Patented Nov. 15, 1955

2,724,103

ELECTRICAL CIRCUITS EMPLOYING MAGNETIC CORE MEMORY ELEMENTS

Robert L. Ashenhurst, Cambridge, Mass., assignor to Bell Telephone Laboratories, Incorporated, New York, N. Y., a corporation of New York Application December 31, 1953, Serial No. 401,466

9 Claims. (Cl. 340—174)

This invention relates to electrical circuits and more particularly to such circuits employing magnetic cores as storage or memory elements.

One manner of arranging magnetic cores for storage of information represented by binary digits has been in matrices wherein the cores are arranged in columns and rows. It is desirable to enable control of the storage and sensing of information in as many cores as possible with a minimum number of control wires and also to be able to employ a sufficient number of control wires that the possibility of erroneous output information due to successive applications of disturbing fields to any one core is substantially negligible. In a copending application Serial No. 401,465, filed December 31, 1953 of R. L. Ashenhurst and R. C. Minnick, certain structures and wiring arrangements are disclosed for attaining the second of these desiderata.

It is an object of this invention to reduce the number of control wires required for a given number of magnetic cores in a matrix.

It is a further object of this invention to provide an improved magnetic core matrix structure wherein a large number of cores may have information stored in them or read out under control of a minimum number of wires.

These and other objects of this invention are attained in one specific illustrative embodiment wherein a number of magnetic cores are arranged in a first coordinate matrix, a first group of wires threading each of the cores horizontally in each row and another group of wires threading each of the cores vertically in each column. The cores may be threaded by additional wires in accordance with the teachings of the above-mentioned Ashenhurst-Minnick application, but we shall concern ourselves primarily with the horizontal and vertical wires. The vertical wires also thread another core matrix, certain of the vertical wires threading the cores of this second matrix along rows and certain others along columns. Thus the vertical wires of the first matrix serve as both the horizontal and vertical wires of the second matrix. Similarly the horizontal wires of the first matrix serve as both the horizontal and vertical wires of a third core matrix. These second and third core matrices advantageously have precisely one-half the number of cores in each coordinate direction of the first matrix, if the first matrix has an even number of cores in each coordinate direction.

This threading of the vertical or horizontal wires of one matrix as both the horizontal and vertical wires of the next matrix is continued with successively smaller matrices until the final matrices have but one core each. When this has been reached each wire of the original matrix has threaded one core in common with every other wire of the original matrix, whether it be originally a horizontal or vertical wire.

In the ordinary core matrix employing merely horizontal and vertical wires, there are $m$ wires to control $\frac{m^2}{4}$ cores and the application of appropriate current pulses to any vertical and any horizontal wire enables the storage of information or the sensing of information priorly stored in the core threaded by the particular vertical and horizontal wires chosen. However, in prior art matrices, if any two horizontal or any two vertical wires are energized no selection at all takes place. In multiple matrices in accordance with aspects of this invention, a magnetic core is associated with each possible pair of the $m$ wires. In multiple matrices in accordance with this invention, the total number of cores that can be controlled by $m$ wires therefore becomes $m(m-1)/2$ and it is apparent that for large values of $m$ this is practically twice the number of cores controlled in the prior art matrices.

In accordance with another aspect of this invention, the multiple matrix structure may be readily attained in a single compact unit employing plates of magnetic material having holes therethrough defining the individual magnetic cores as taught in the above-mentioned Ashenhurst-Minnick application. Advantageously two plates of magnetic material, or two sets of such plates, are employed and supported in two closely adjacent planes. Successive matrices in the wiring arrangement are defined by holes in magnetic plates in different planes. The first or initial matrix may be in the base plane and the next two matrices in the upper plane; then the next four matrices, whose wires comprise the vertical and horizontal wires of the two matrices in the upper plane, are themselves again in the base or lower plane. Thus, the wires will alternately thread matrices in the two different planes.

Each plane may be defined by a single magnetic member or may be defined by a number of such members. While there are a number of advantages of employing but one magnetic plate for each plane, certain of the wires on threading the last core of a matrix in, say, the base plane, may be beneath that plane and have to next thread a core in a direction from above the upper plane. An economy of wire is therefore attained if an edge which the wire can traverse is not too far removed from the last cores in each matrix.

These plates or sheets of magnetic material may be positioned tightly between sheets of insulating material. While a pile up of only three sheets of insulating material is required for the two groups of magnetic plates, it is convenient to employ four such sheets with a slight gap between the two pairs of sheets to facilitate the threading of the wires through the appropriate cores.

Terminals are mounted by one or both of the outer insulating sheets and provide the connecting links between the wires of the multiple matrix and the appropriate external circuitry. Additionally a read-out wire threads all cores of the multiple matrix.

It is therefore a feature of this invention that the wires threading each core are utilized more efficiently so that the number of cores controlled by a given number of wires is increased by employing multiple matrices, the horizontal and vertical wires of any of which, except the first, comprise either the horizontal or vertical wires of the preceding matrix.

It is a feature of this invention that a first matrix comprise a coordinate array of magnetic cores having horizontal and vertical wires threading the cores in the coordinate directions and that successive matrices comprise coordinate arrays of magnetic cores whose vertical and horizontal wires comprise either the vertical or horizontal wires of the preceding matrix so that each wire in the multiple matrix thus defined threads one magnetic core in common with every other wire in the multiple matrix.

It is a further feature of this invention that the magnetic cores in a multiple matrix be defined by holes in at least two magnetic plates arranged in two adjacent planes, successive matrices in the multiple matrix being on alternate planes.

A complete understanding of this invention and of these and various other features thereof may be gained from the following detailed description and the accompanying drawing, in which.

Figure 1:
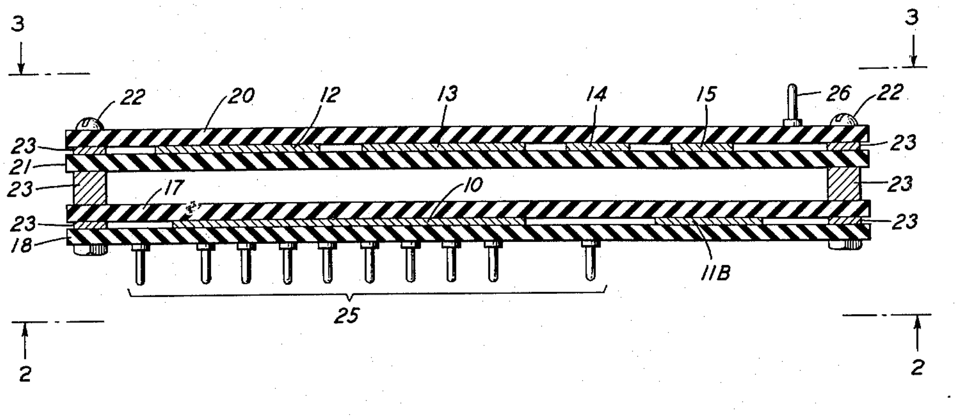
Fig. 1 is a sectional view of one specific illustrative embodiment of this invention, no wiring details being depicted however to prevent obscuring of the drawing.

Turning now to the drawing, in the specific illustrative embodiment depicted in Fig. 1 the various magnetic core matrices are each defined by holes in magnetic plates 10, 11A, 11B, 11C and 11D, 12, 13, 14 and 15. Plates 10 and 11A, 11B, 11C and 11D are mounted between two insulating sheets 17 and 18 and plates 12, 13, 14 and 15 are similarly mounted between two insulating sheets 20 and 21. The magnetic plates and insulating sheets are mounted together in a tight compression assembly by means of a number of bolts, such as the bolts 22 extending through the corners of the insulating sheets; spacers and washers 23 encompasses the bolts 22 to provide the appropriate spacing between the different insulating sheets. A plurality of terminal pins 25 are mounted by the bottom insulator sheet 18 and a pair of terminal pins 26 by the uppermost insulating sheet 20.

Figure 4:
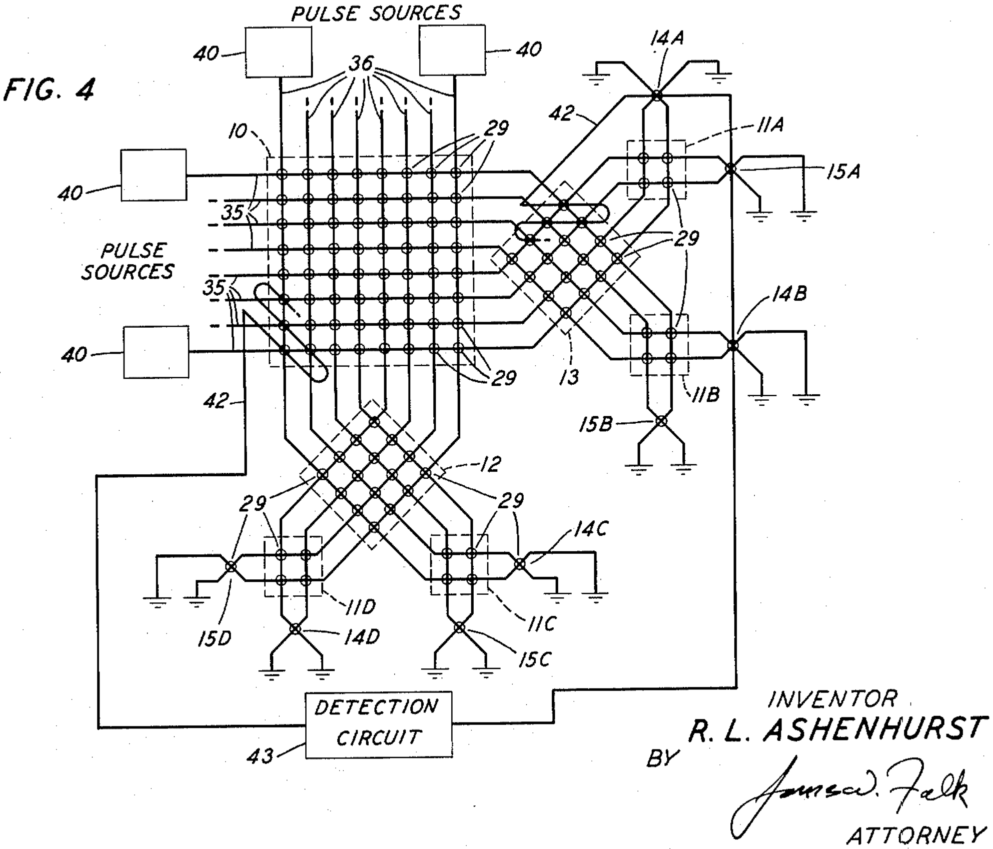
Fig. 4 is a schematic representation of the wiring of the embodiment of Fig. 1.

The insulating sheets 17, 18, 20 and 21 have apertures 28 therein mating with the holes 29, best seen in the schematic representation of Fig. 4, in each of the magnetic plates. Additionally there are a number of peripheral apertures 30 which extend through the insulating members adjacent the edges of each magnetic plate to facilitate the threading of the wires around these edges and through the plates.

In one specific embodiment of this invention each of the magnetic plate members 10, 11, 12, 13, 14 and 15 was of 0.0005 inch 4–79 molybdenum Permalloy and the holes 29 defining the magnetic cores were each 0.0625 inch in diameter and spaced 0.3937 inch between centers. 4–79 molybdenum Permalloy is a magnetic material of about 4 per cent molybdenum, 79 per cent nickel, and the balance substantially iron.

Turning now to Fig. 4, the wiring arrangement of a multiple matrix in accordance with this invention is there depicted schematically. As can be seen wires 35 thread each core 29 in each row of the initial matrix on plate 10 and similarly wires 36 thread each core 29 in the other coordinate direction. The wires 35 are referred to herein as the initial horizontal wires and the wires 36 as the initial vertical wires. Advantageously a pulse source 40 is associated with each of the wires 35 and 36 to apply the appropriate current pulses for the storage of information and for the sensing of information priorly stored in any of the cores 29 in the initial matrix of plate 10.

The wires 35 upon leaving the initial matrix of plate 10 divide into two groups which define the vertical and horizontal wires of the matrix of plate 13. Similarly the wires 36 are divided into two groups which define the horizontal and vertical wires of the matrix of plate 12. In turn these horizontal and vertical groups of wires are divided to provide the horizontal and vertical wires of the four smaller matrices of plates 11A, 11B, 11C and 11D. Finally the pairs of vertical and horizontal wires of these matrices are divided and the individual wires thread the cores 29 of the matrices identified on Fig. 4 as 14A, 14B, 14C and 14D and 15A, 15B, 15C and 15D and physically located in this embodiment in plates 14 and 15.

The wires 35 and 36 are connected to the terminal pins 25 positioned on the under insulating sheet 18, a lead wire advantageously then connects the terminals with the pulse sources. The other end of each wire 35 and 36 is connected to one of the terminals 26 on the upper insulating sheet 20, which terminal is connected to ground. A single read-out wire 42 is threaded through each of the holes 29 in all the matrices of the multiple matrix configuration and is connected to one terminal 25 on the lower insulating sheet and one terminal 26 on the upper insulating sheet. A detection circuit 43 is connected between the opposite ends of the read-out wire 42 as is known in the art.

Figure 2:
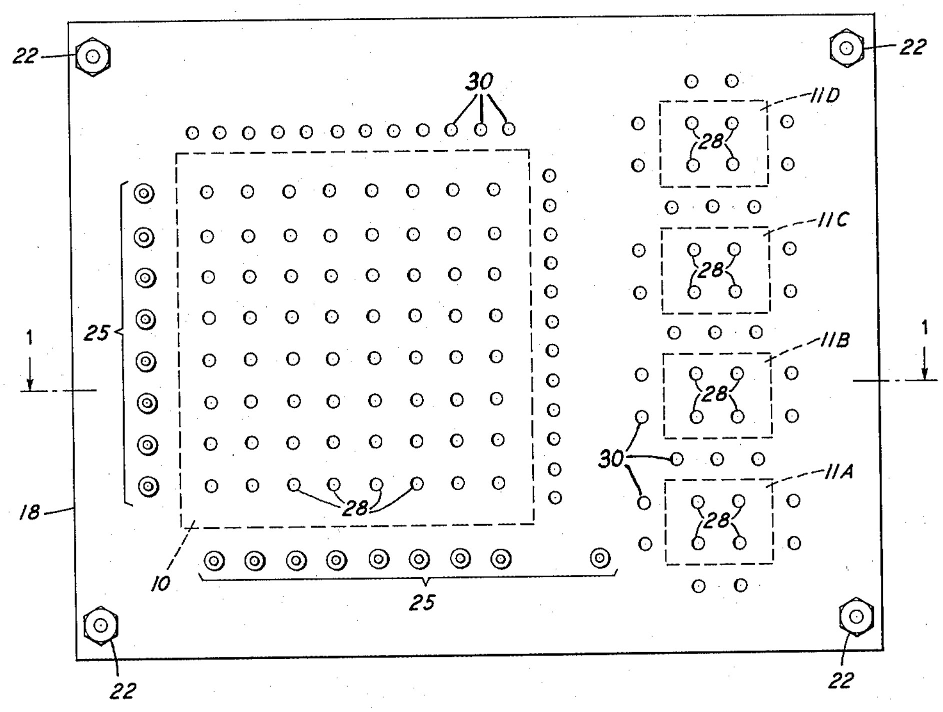
Fig. 2 is a bottom plan view of the embodiment of Fig. 1 along the line 2—2 thereof.
Figure 3:
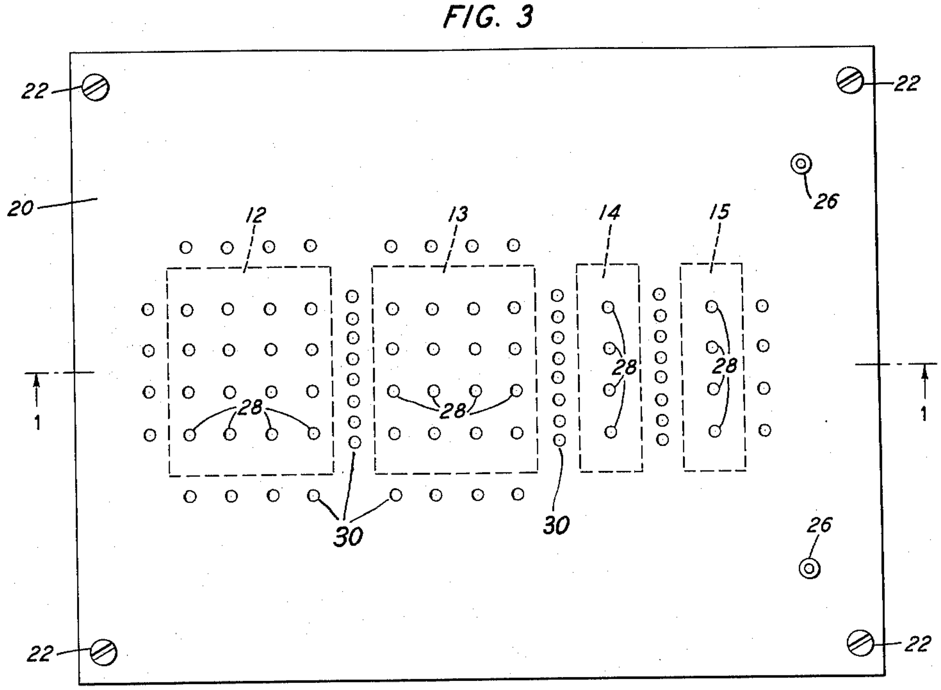
Fig. 3 is a top plan view of the embodiment of Fig. 1 along the line 3—3 thereof.

It is apparent that in the configuration depicted in Fig. 4 each wire intersects one core in common with every other wire so that the application of appropriate pulses to any two wires of the multiple matrix will cause the storage or sensing of information at an individual and particular core. Further by having magnetic plates define the individual core matrices and mounting these plates in two planes in a structure as depicted in Figs. 1, 2 and 3 a compact assembly is attained that is economical in the lengths of wire sections between successive holes both in individual matrices and in successive matrices. Additionally, as mentioned above, the selection-to-noise ratio may be improved by threading additional wires through the holes as taught in the priorly mentioned Ashenhurst-Minnick application; in such an array the number of wires threading a core in the first matrix determines the number of matrices in the next stage of the array. However, regardless of the number of wires threading each hole, any core is determined by any two of the wires 35, 36.

It is to be understood that the above-described arrangements are illustrative of the application of the principles of the invention. Numerous other arrangements may be devised by those skilled in the art without departing from the spirit and scope of the invention.

What is claimed is:

1. An electrical circuit comprising a first group of magnetic cores arranged in a coordinate array, horizontal wires threading each core in the rows of said array, vertical wires threading each core in the columns of said array, and a plurality of other groups of magnetic cores, certain of said cores of said other groups being threaded by two of said horizontal wires and certain of said cores of said other groups being threaded by two of said vertical wires, each of said wires threading one core threaded by every other of said wires.

2. An electrical circuit comprising a first matrix comprising a coordinate array of magnetic cores and horizontal and vertical wires threading the cores in the coordinate directions, a plurality of successive matrices each comprising a coordinate array of magnetic cores having horizontal and vertical wires threading the cores in the coordinate directions, the horizontal and vertical wires of said successive matrices being electrically continuations of the horizontal or vertical wires of the preceding matrix and the number of said matrices being sufficient that each horizontal wire of the first matrix threads one core in another matrix jointly with each of the other horizontal wires of the first matrix and each vertical wire of the first matrix threads one core in another matrix jointly with each of the other vertical wires of the first matrix, and means applying pulses to said wires of said first matrix, whereby the application of pulses to any two wires of said first matrix changes the magnetic state of a single core in the circuit.

3. An electrical circuit comprising at least one magnetic member having a plurality of holes therein defining magnetic cores and positioned in a first plane, at least another magnetic member having a plurality of holes therein defining magnetic cores and located in a second plane adjacent said first plane, said holes of said first and second members defining a plurality of coordinate arrays of magnetic cores, and horizontal and vertical wires threading each of the cores of a first of said arrays in said coordinate directions, certain successive others of said arrays being threaded by two of said horizontal wires and certain successive others of said array being threaded by two of said vertical wires, said successive arrays being alternately in said two planes and each of said wires threading one hole in a magnetic member threaded by every other of said wires.

4. An electrical circuit comprising a first magnetic member having a plurality of holes therein defining a first coordinate array of magnetic cores, horizontal wires threading the holes of said first array in one coordinate direction, vertical wires threading the holes of said first array in the other coordinate direction, a plurality of othr magnetic members each having a plurality of holes therein and defining successive coordinate arrays of magnetic cores, certain of said successive arrays being threaded in both coordinate directions by the horizontal wires of the preceding array and certain other of said successive arrays being threaded by the vertical wires of the preceding array, and means applying pulses to said wires of said first array, whereby the application of pulses to any two wires of said first array changes the magnetic state of a single core in said arrays.

5. An electrical circuit in accordance with claim 4 and further comprising means supporting said magnetic members defining successive arrays alternately in two adjacent parallel planes.

6. An electrical circuit in accordance with claim 5 wherein said supporting means comprises a pair of insulating sheets adjacent said magnetic members in one plane and a pair of insulating sheets adjacent said magnetic members in the other plane, each of said sheets having apertures therein mating with said holes in said magnetic members.

7. An electrical circuit comprising a first magnetic member having a plurality of holes therein defining a coordinate array of magnetic cores, horizontal wires threading the holes of said first array in one coordinate direction, vertical wires threading the holes of said first array in the other coordinate direction, a plurality of other magnetic members each having a plurality of holes therein and defining successive coordinate arrays of magnetic cores, certain of said successive arrays being threaded in both coordinate directions by the horizontal wires of the preceding array and certain other of said successive arrays being threaded by the vertical wires of the preceding array, means applying pulses to any two wires of said first array to alter the magnetic condition of the magnetic material encompassing any one of said holes in any of said arrays, and a single read-out wire threading all of said holes.

8. An electrical circuit comprising a first coordinate array of magnetic core members, horizontal wires threading said members of said first array in one coordinate direction, vertical wires threading said members of said first array in the other coordinate direction, means defining a plurality of successive coordinate arrays of magnetic core members, certain of said successive coordinate arrays being threaded in both coordinate directions by the horizontal wires of the preceding array and certain other of said successive arrays being threaded by the vertical wires of the preceding array, and means applying pulses to any two of said wires of said first array to alter the magnetic condition of a particular one of said magnetic core members in any of said arrays.

9. An electrical circuit in accordance with claim 8 and further comprising a single read-out wire threading all of said core members in said arrays.

References Cited in the file of this patent

UNITED STATES PATENTS

| | | |
|---|---|---|
| 1,547,964 | Semat | July 28, 1925 |
| 2,139,079 | Haselton | Dec. 6, 1938 |